United States Patent
Doyle

(10) Patent No.: US 7,641,293 B2
(45) Date of Patent: Jan. 5, 2010

(54) OFFSET TRACK

(75) Inventor: Richardson J. Doyle, Bangkok (TH)

(73) Assignee: McLaren Group Holdings PTE, Ltd., Singapore (SG)

(*) Notice: Subject to any disclaimer, the term of this patent is extended or adjusted under 35 U.S.C. 154(b) by 13 days.

(21) Appl. No.: 12/039,493

(22) Filed: Feb. 28, 2008

(65) Prior Publication Data
US 2008/0203813 A1    Aug. 28, 2008

Related U.S. Application Data

(60) Provisional application No. 60/904,226, filed on Feb. 28, 2007.

(51) Int. Cl.
*B62D 55/24* (2006.01)
(52) U.S. Cl. ...................... 305/171; 305/177
(58) Field of Classification Search ......... 305/112–114, 305/167, 169–171, 173–177, 193, 195
See application file for complete search history.

(56) References Cited

U.S. PATENT DOCUMENTS

| | | | | | |
|---|---|---|---|---|---|
| 5,380,076 | A | * | 1/1995 | Hori | ........................... 305/171 |
| 5,692,615 | A | * | 12/1997 | Fischer | ........................ 206/440 |
| 6,170,925 | B1 | * | 1/2001 | Ono | ............................ 305/177 |
| 6,520,603 | B2 | * | 2/2003 | Shimada et al. | ............. 305/167 |
| 6,709,077 | B2 | * | 3/2004 | Watanabe et al. | ........... 305/177 |
| 7,014,279 | B2 | * | 3/2006 | Watanabe et al. | ........... 305/179 |
| 7,044,567 | B2 | * | 5/2006 | Ishibashi | ..................... 305/167 |
| 7,495,171 | B2 | * | 2/2009 | Gorin et al. | ................... 174/66 |
| 2004/0070273 | A1 | | 4/2004 | Safe et al. | .................... 305/157 |
| 2004/0207259 | A1 | | 10/2004 | Peterson et al. | ............. 305/157 |
| 2005/0168069 | A1 | * | 8/2005 | Ueno | ........................ 305/171 |

* cited by examiner

*Primary Examiner*—Jason R Bellinger
(74) *Attorney, Agent, or Firm*—Paul J. Backofen, Esq.; Crockett & Crockett

(57) ABSTRACT

An offset track forms a pattern perpendicular to the centerline of the track which enables tracks to be formed with even or odd number of metal inserts and thus accommodate virtually any tracked vehicle. The offset track uses variations in body thickness and lug width to provide a high performance offset track with improved ride, minimum vibration and longer wear. Use of full size and mini-inserts in a single track minimizes the weight and further enhances the performance of an offset track.

1 Claim, 8 Drawing Sheets

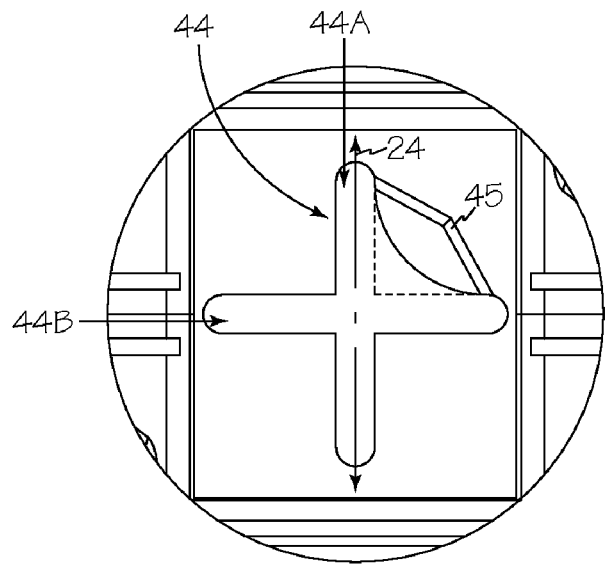
Fig. 10
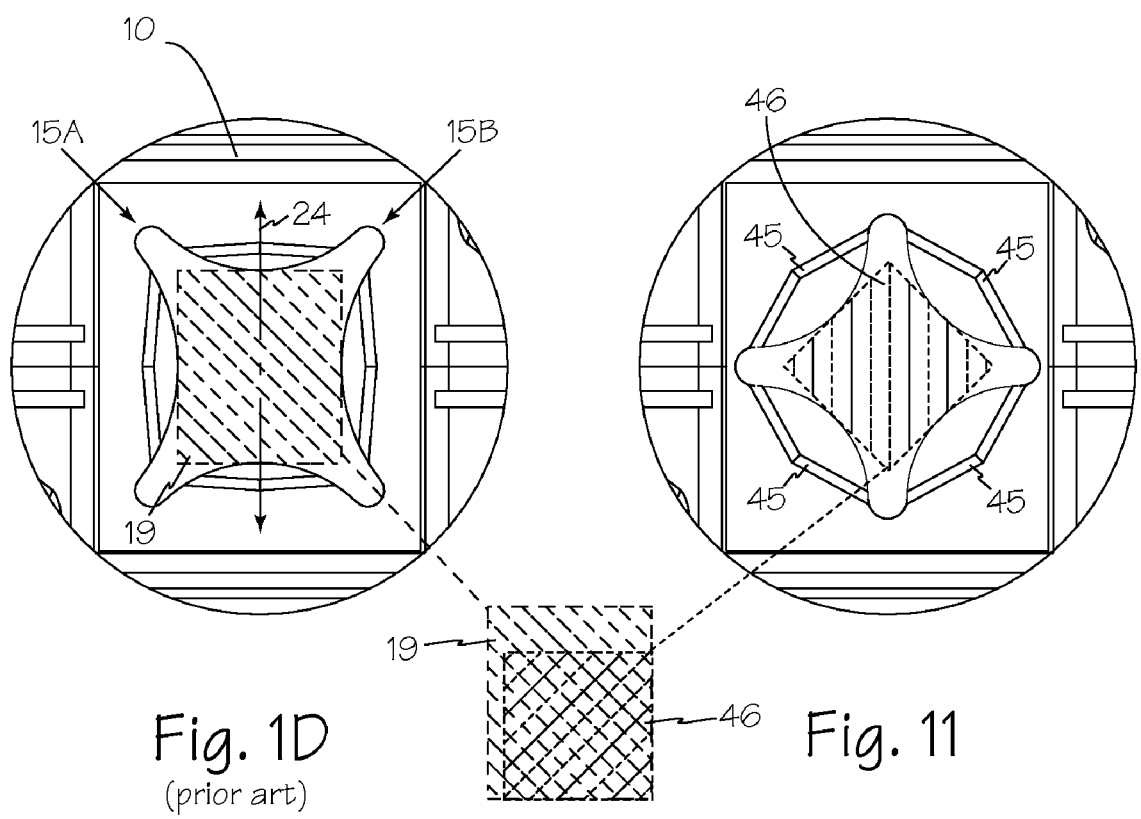
Fig. 1D
(prior art)
Fig. 11

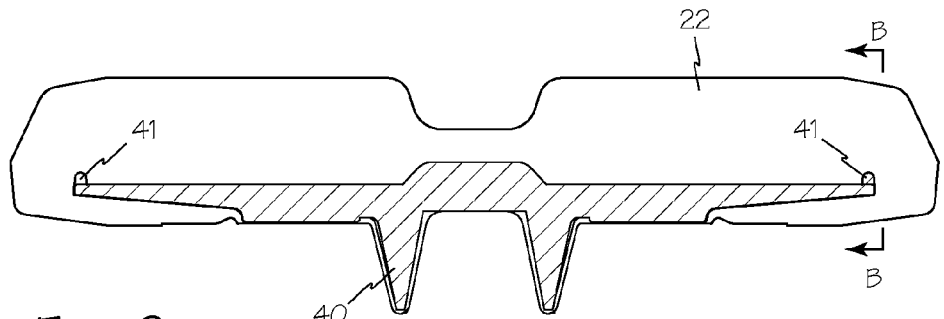
Fig. 6
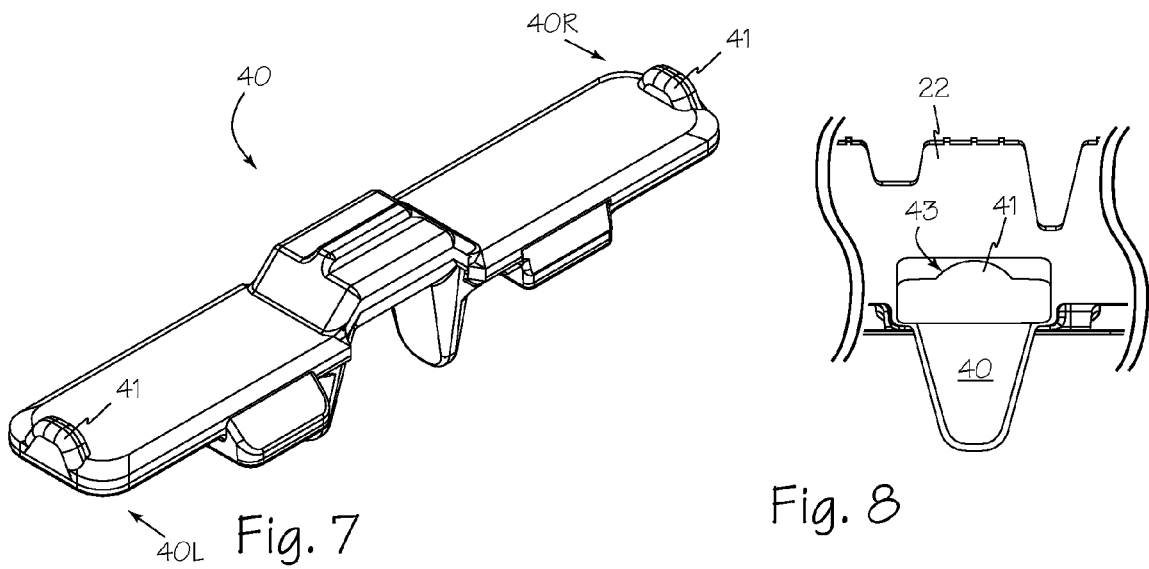
Fig. 7
Fig. 8
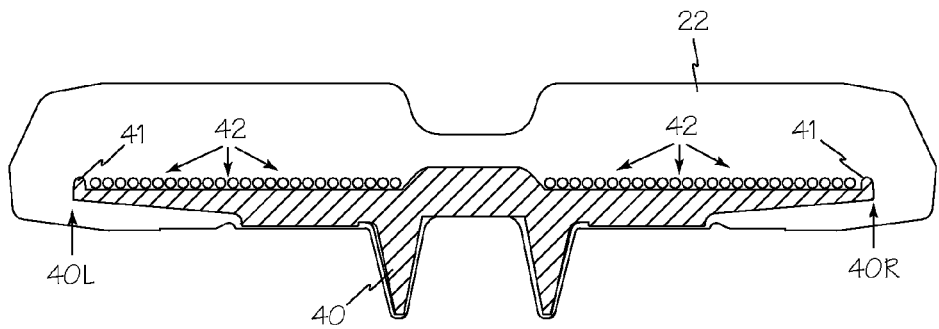
Fig. 9

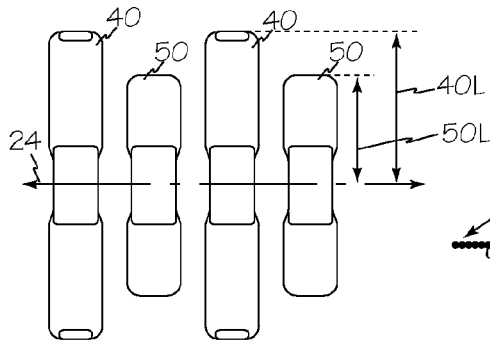
Fig. 12
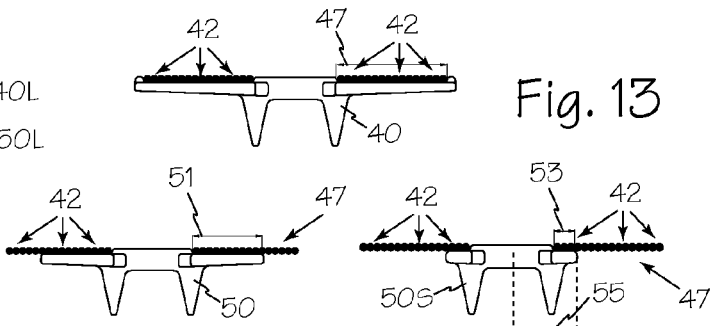
Fig. 13
Fig. 14A
Fig. 14B
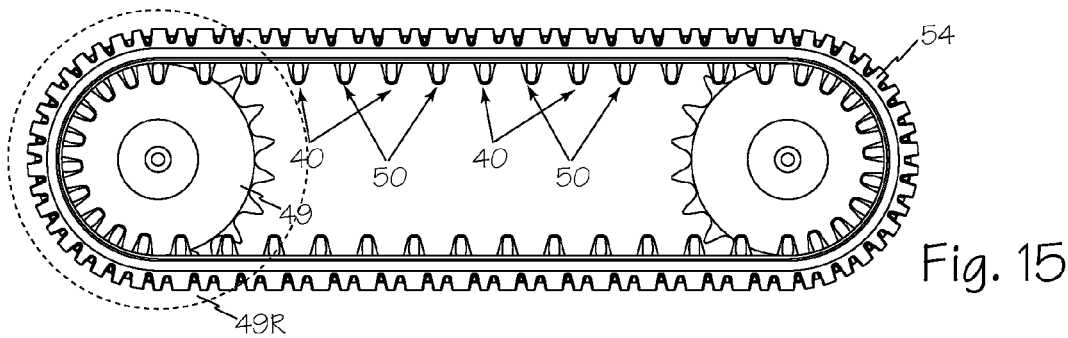
Fig. 15
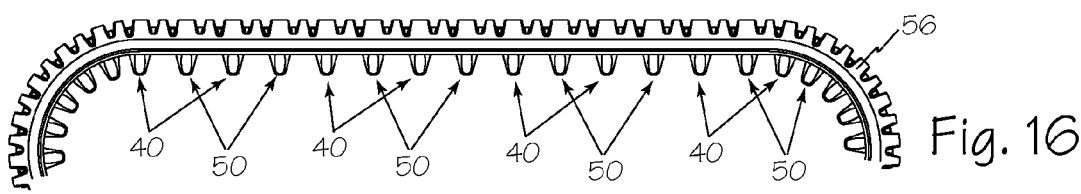
Fig. 16
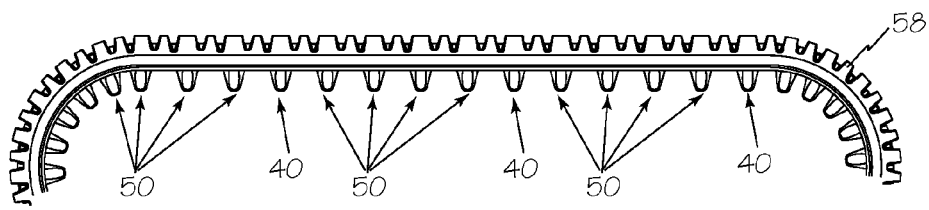
Fig. 17
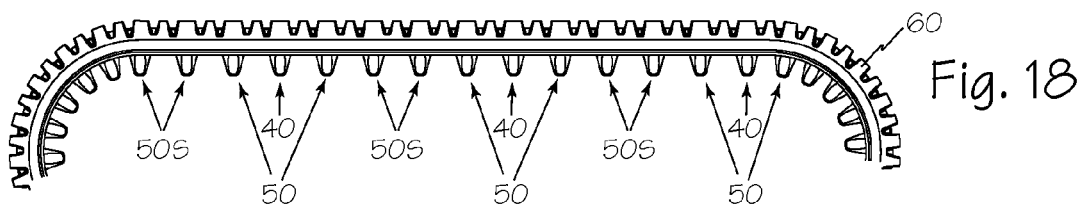
Fig. 18

OFFSET TRACK

RELATED APPLICATIONS

This application claims priority from copending U.S. Provisional patent application No. 60/904,226 filed Feb. 28, 2007.

FIELD OF THE INVENTIONS

The inventions described below relate to the field of tracked construction equipment and more specifically to rubber tracks with metal inserts for construction equipment.

BACKGROUND OF THE INVENTIONS

Conventional rubber tracks for construction equipment are an expensive component and may be responsible for many problems that plague the equipment. Most tracked equipment does not have suspension and thus any vibrations or shocks created, fostered or enhanced by the tracks travel directly to the equipment and contribute to operator fatigue and equipment wear and failure.

Conventional thinking about offset tracks teaches that bigger lugs provided longer wear. However larger lugs also enable the inevitable cracks that form in the rubber to grow in a larger lug and thus when a chunk of rubber breaks off, it is a large chunk and will exacerbate the uneven ride and vibrations inherent in conventional offset tracks. Larger lugs in offset tracks also force larger spaces between the lugs thus enabling any rocks or other things protruding from the generally uneven terrain in construction areas to cut, gouge and generally wear the body of the tracks. This leads to most tracks falling apart long before they wear out.

What is needed is an offset track that wears longer and more evenly than conventional tracks thus minimizing vibration, improving the ride and performance of the track.

SUMMARY

An offset track forms a pattern perpendicular to the centerline of the track which enables tracks to be formed with even or odd number of metal inserts and thus accommodate virtually any tracked vehicle. The offset track uses variations in body thickness and lug width to provide a high performance offset track with improved ride, minimum vibration and longer wear. Use of full size and mini-inserts in a single track minimizes the weight and further enhances the performance of an offset track.

A sprocket driven rubber track may include metal inserts for engaging the drive mechanism of the tracked vehicle. The metal inserts according to the present disclosure include a rounded lip at the outboard edge. The lip operates during the layup of the track to contain the metal cables and during the rubber molding process, the lips prevent the cables from moving outboard under pressure of the rubber flow. The lip is rounded to minimize the likelihood of the lip causing a stress crack emanating from a corner of the lip.

A sprocket driven rubber track is formed with narrow tread lugs to minimize the propagation of cracks in the rubber of the lugs. On conventional tracks with wide lugs, a crack that propagates across the lug may cause a large chunk of the lug to break off which at a minimum will cause additional vibration as the broken lug engages the ground. Using narrower lugs limits propagation of cracks and results in smaller chunks of lug breaking off thus resulting in a smoother ride and less vibration induced maintenance for the machine.

A sprocket driven rubber track may also include sprocket hole cuts oriented parallel and perpendicular to the centerline of the track to minimize the open space and prevent debris from fouling the drive mechanism when the sprocket engages the hole.

In an alternate configuration, a rubber track may include metal inserts of different sizes to reduce cost and weight and improve flexibility of the track. Mini-inserts may alternate with full size inserts to provide modest weight savings and the ratio of full size metal inserts to mini-inserts may vary according to the weight of the vehicle, the track strength requirements and the required track flexibility. The length of the mini-inserts may also vary from the full size metal insert to the smallest practical insert which engages no less than 20% of the width of each wire belt within the track. Each track may have a variety of different length metal inserts in a single track to permit customizing the weight and flexibility of a track to a particular machine and the expected work environment.

Metal inserts to be installed in a rubber track may also include one or more ribs, ridges, troughs or holes to provide additional surface area for adhesion to the rubber of the track. The additional surface area is particularly important for inserts that are smaller than a full size insert and prevents the smaller inserts from breaking loose from the track when under load.

An offset track for engaging one or more drive sprockets of a tracked vehicle along a centerline of the track may include two continuous metal belts composed of a plurality of metal cables each metal belt disposed on one side of the centerline, a continuous rubber track body having an offset pattern of lugs relative to the centerline and enveloping the two continuous metal belts, the offset pattern of lugs alternating joint lugs and insert lugs, and a plurality of metal inserts for engaging the one or more drive sprockets of the tracked vehicle, the metal inserts oriented perpendicular the centerline of the track and engaging at least a portion of each metal belt, each metal insert having a first end, a second end and a long axis with a lip at the first end and the second end for engaging the two metal belts.

BRIEF DESCRIPTION OF THE DRAWINGS

FIG. 1D is a close-up view of a conventional sprocket opening.

FIG. 6 is an edge view of a metal insert according to the present disclosure.

FIG. 7 is perspective view of the metal insert of FIG. 6.

FIG. 8 is a side view of the metal insert of FIG. 6.

FIG. 9 is an edge view of the metal insert of FIG. 6 with the cables shown.

FIG. 10 is a close view of a sprocket hole according to the present disclosure.

FIG. 11 is a close view of the sprocket hole of FIG. 10 with the flaps folded open.

FIG. 12 is a top view of alternating full size and mini-inserts for an alternate track.

FIG. 13 is an edge view of a full size metal insert engaging the full track belts.

FIG. 14A is an edge view of a mini-metal insert engaging a portion of the track belts.

FIG. 14B is an edge view of a minimum metal insert engaging the smallest portion of the track belts.

FIG. 15 is a side view of a vehicle track illustrating an arrangement of full size and mini metal inserts.

FIG. 16 is a side view of a vehicle track illustrating an alternate arrangement of full size and mini metal inserts.

FIG. 17 is a side view of a vehicle track illustrating another alternate arrangement of full size and mini metal inserts.

FIG. 18 is a side view of a vehicle track illustrating an arrangement of various sized metal inserts.

DETAILED DESCRIPTION OF THE INVENTIONS

Figure 1A:
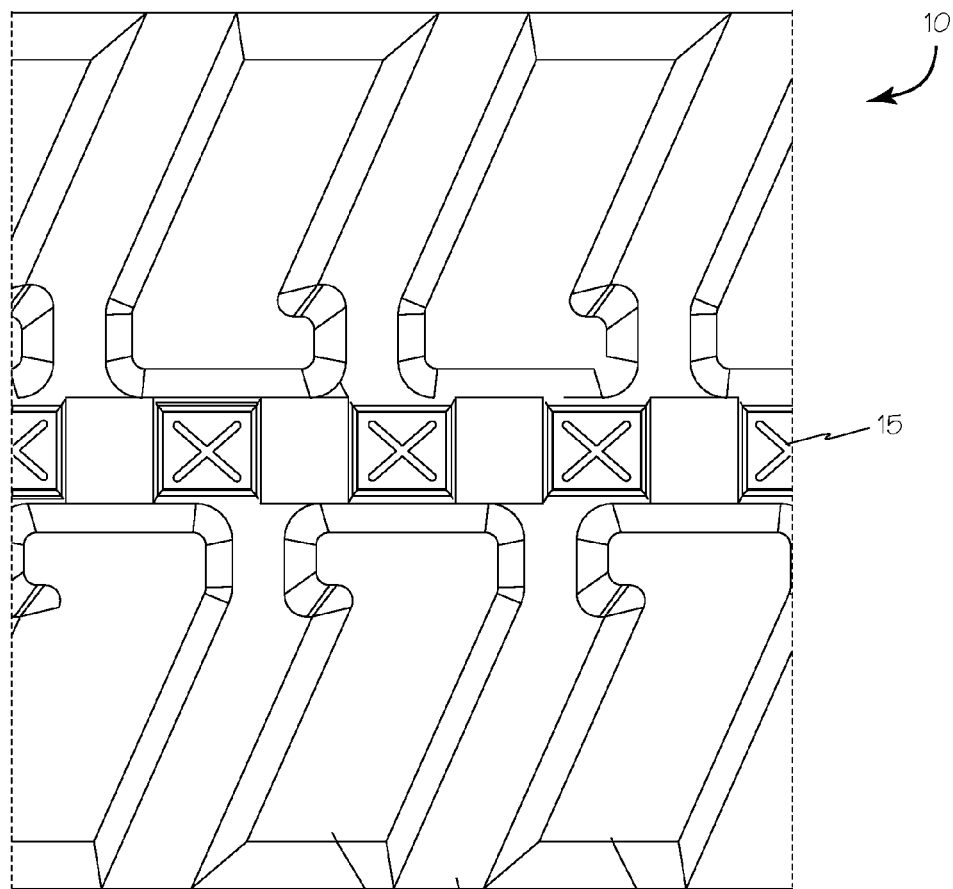
FIG. 1A is a top view of a section of conventional offset track.
Figure 1B:
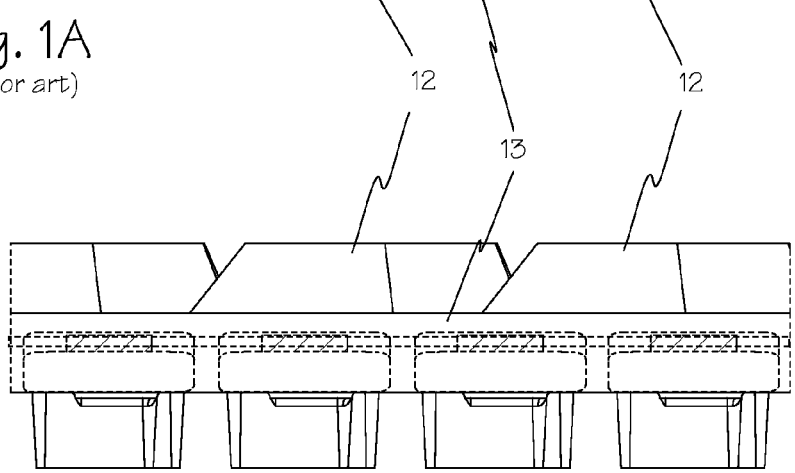
FIG. 1B is a side view of the section of the conventional track of FIG. 1A.

In conventional tracks such as the conventional offset track 10 of FIG. 1A and FIG. 1B, lugs such as lugs 12 are separated by track body 13. Sprocket holes such as sprocket hole 15 are often provided with cutouts rotated 45° from the track centerline, in the form of an X shape, to enable the drive sprockets to extend through track body 13.

Figure 2:
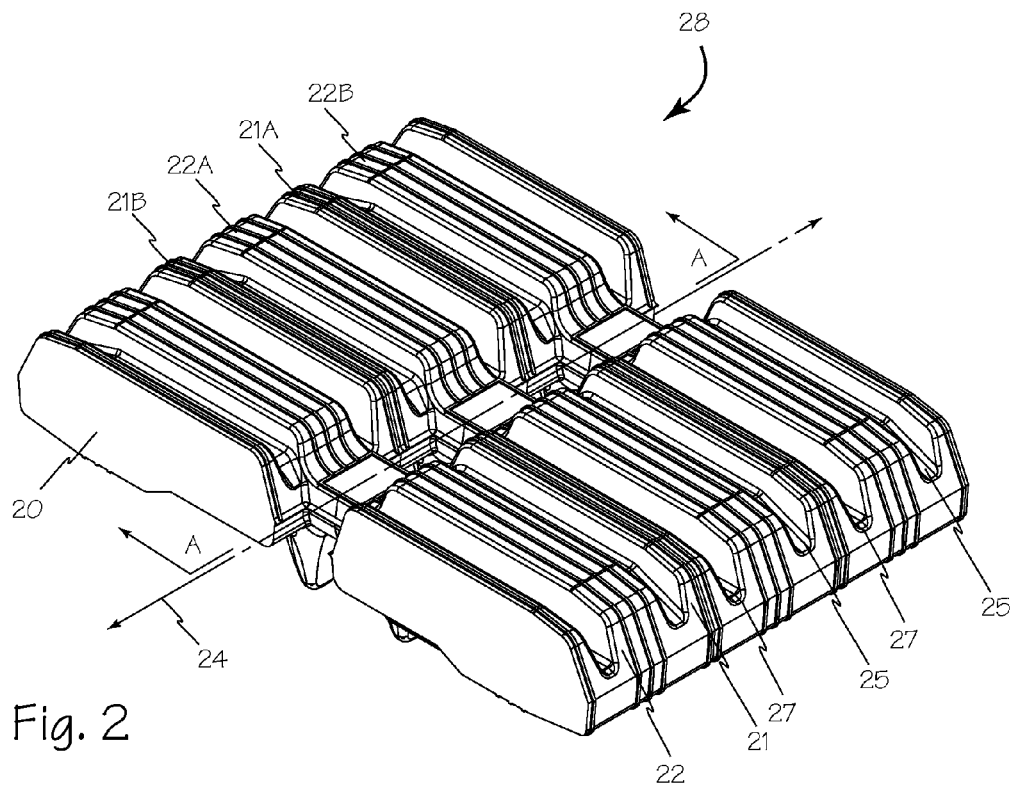
FIG. 2 is perspective view of a section of an offset track according to the present disclosure.
Figure 3:
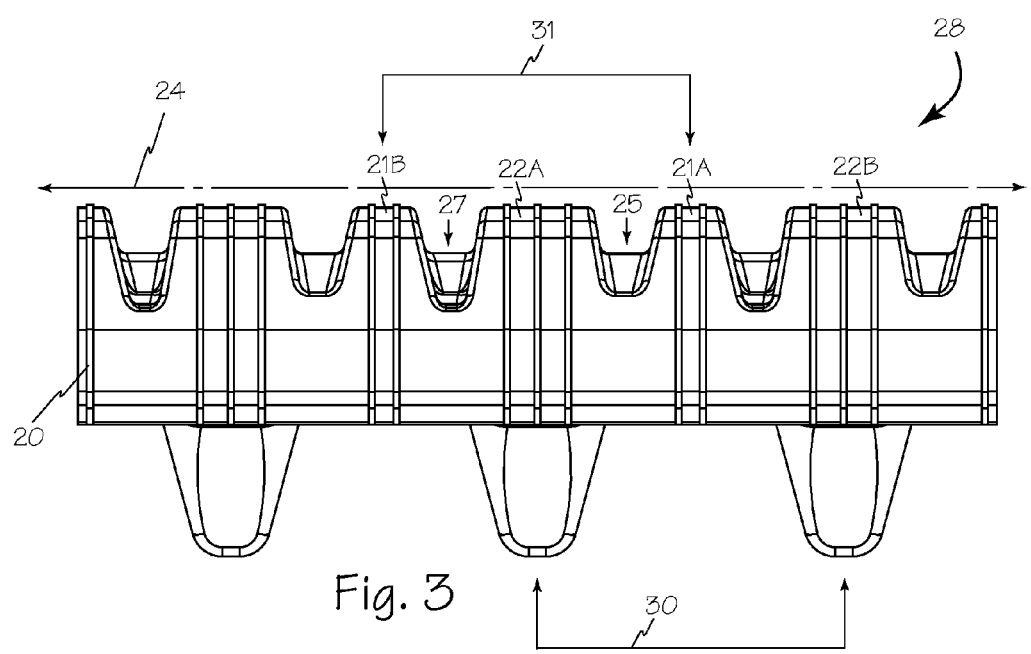
FIG. 3 is side view of the track section of FIG. 2.
Figure 4:
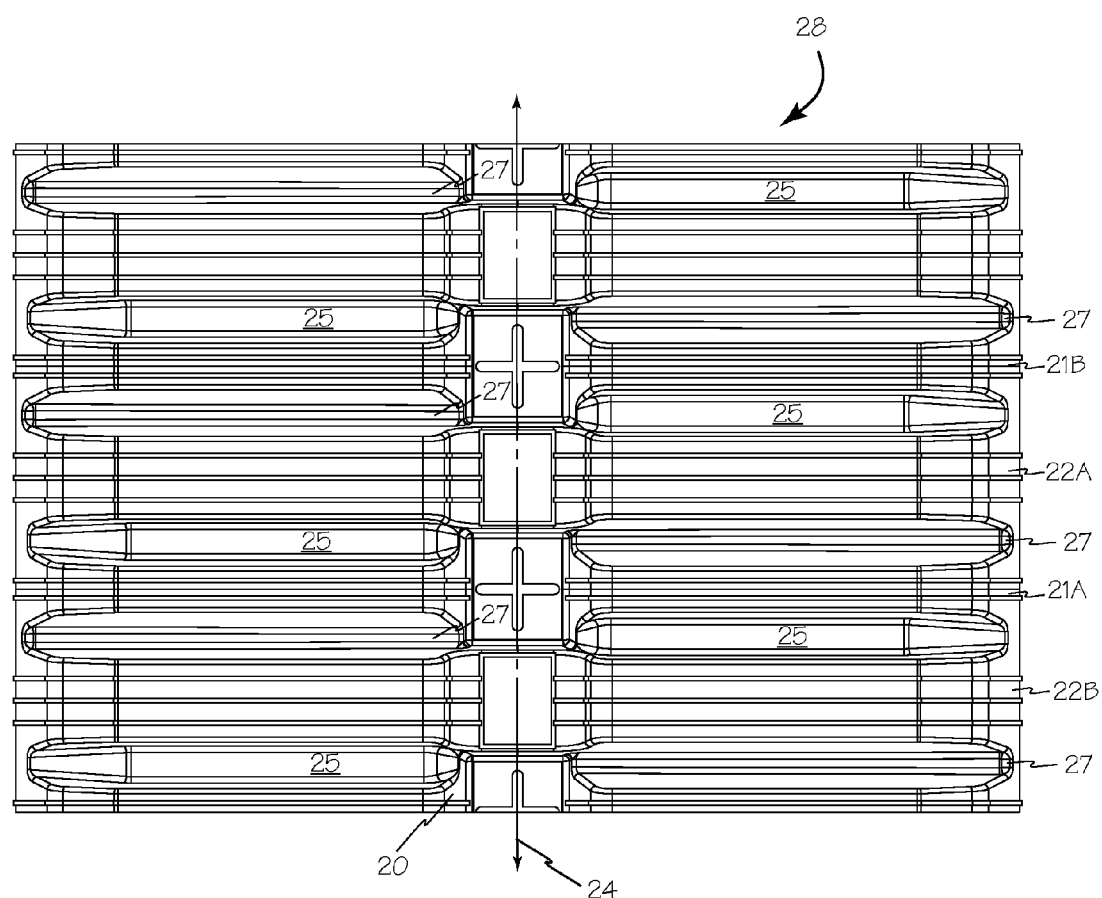
FIG. 4 is top view of the track section of FIG. 2.

In a continuous track with variable lug width such as track 20 of FIG. 2, FIG. 3 and FIG. 4, the width of lugs such as joint lug 21 and insert lug 22 may alternate to provide an offset pattern with the lugs perpendicular to centerline 24. The dimensions of recesses such as reinforced recess 25 and recess 27 alternate according to offset pattern 28. Reinforced recesses 25 alternate with open recesses 27 along the track, parallel with the track centerline, and the recesses also alternate across the track centerline. The alternation of unreinforced recesses or open recesses 27 promotes track flex and the alternation of the reinforced recesses such as recess 25 across the track centerline balances the flex torque when the track is bending.

Pattern 28 provides three generally evenly spaced lugs, insert lugs 22A and 22B and joint lug 21A per pitch 30 on each side of track centerline 24. Alternate pitch 31 may also be considered and it also contains three lugs per pitch, per side, insert lug 22B and joint lugs 21B and 21A.

Figure 1C:
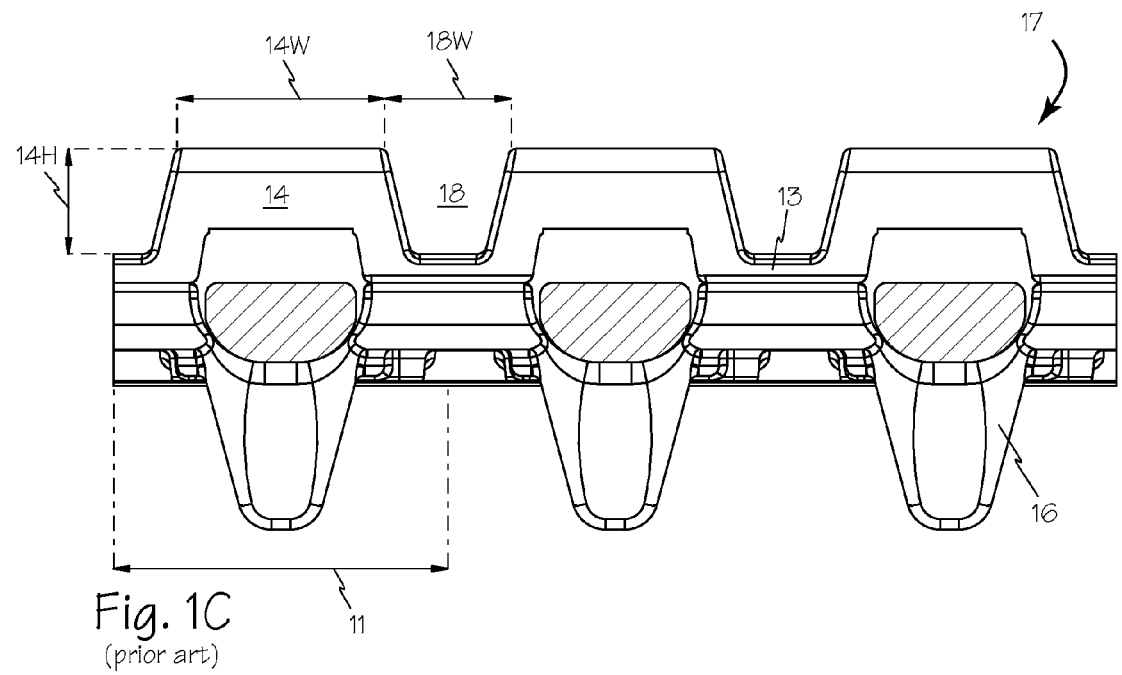
FIG. 1C is a cutaway view of a section of conventional track.
Figure 5:
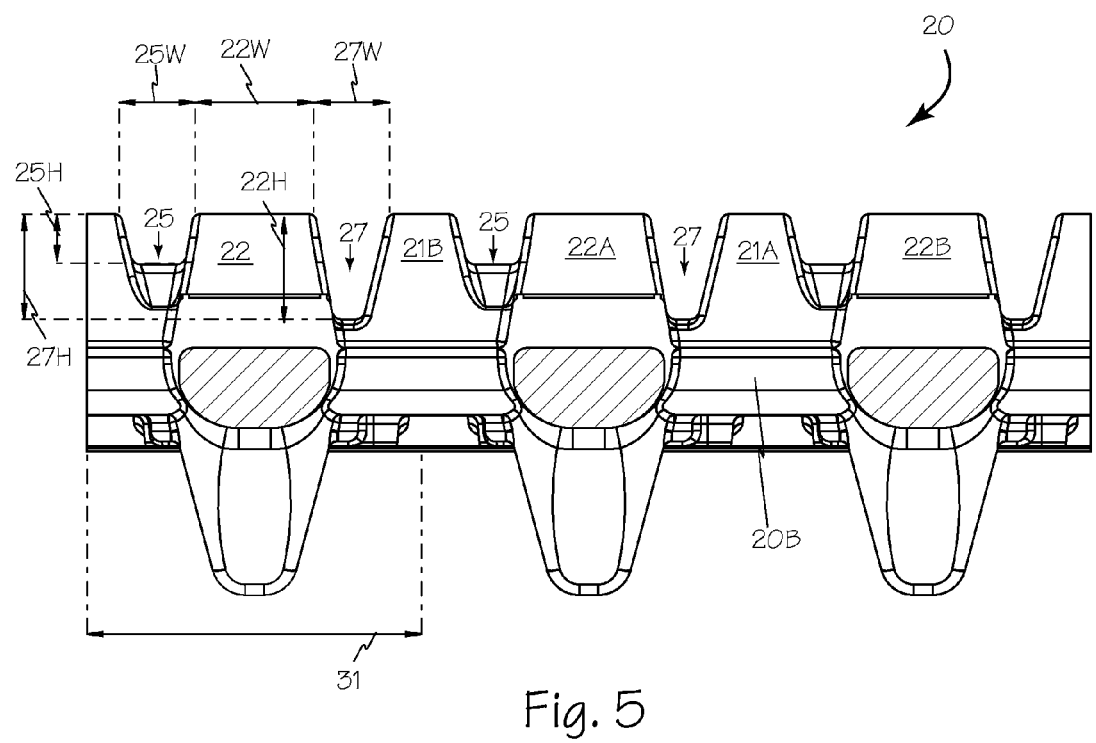
FIG. 5 is cross section view of the track section of FIG. 2 taken along A-A.

Comparing conventional track 17 of FIG. 1C and variable lug offset track 20 of FIG. 5 illustrates the wear resistant design of track 20. Minimizing recess widths 25W and 27W compared to conventional recess width 18W expose less of track body 20B through narrow recess openings 25 and 27 which are narrower and closer together than conventional configurations. The height 22H of tread 22 is at least as high as height 14H of conventional tread 14. Width 22W is also less than width 14W. The alternating depth 25H and 27H of recesses 25 and 27 respectively is mirrored and offset across track centerline 24.

Referring now to FIGS. 6-9, metal inserts such as insert 40 are included in tracks such as track 20 to provide lateral strength and to engage the drive mechanism of the machine on which the track is secured. Two lips such as lip 41 may be added to metal insert 40 to prevent the cables 42 from moving out beyond first end 40L or second end 40R during the track casting process. If each lip is formed using curved shape 43 would eliminate corners from the insert as sources for cracks and stress in the molded rubber of the finished track. The metal inserts such as insert 40 are molded into the track in the center of an insert lug such as lug 22 as shown in FIG. 5, or lug 22A or 22B of FIGS. 2 through 4.

Sprocket holes are formed in many rubber tracks to permit the ends of the sprocket teeth to extend through the track without damaging the track. As shown in FIG. 1D, conventional sprocket holes such as hole 15 include flaps formed by intersecting slots 15A and 15B. Slots 15A and 15B form an acute angle relative to centerline 24. When a sprocket tooth is fully inserted, the conventional sprocket hole opens to form sprocket hole or opening 19.

Track 20 includes aligned sprocket holes such as sprocket hole 44 including intersecting slots such as slot 44A which is aligned parallel to centerline 24 and slot 44B which is aligned perpendicular to centerline 24. Flaps such as flap 45 are formed by intersecting slots 44A and 44B. When a sprocket tooth is fully inserted, sprocket hole 44 opens as flaps 45 are bent open to form sprocket hole or opening 46. As illustrated between FIG. 1D and FIG. 11, opening 46 is smaller than opening 19 thus permitting less debris and mud to travel through track 20 and potentially foul the drive mechanism of the machine.

In an alternate offset track, metal inserts such as metal insert 40 may be included in a track with two or more mini-inserts such as mini-insert 50 of FIG. 12. The use of mini-inserts reduces weight and increases the flexibility of a track which will improve the ride and minimize vibration. As illustrated in FIG. 13 and discussed above, a full size metal insert such as insert 40 engages the entire set of metal cables 42 which form continuous belts such as belt 47 within a track. Generally a track includes two belts in a track. Using mini-inserts such as insert 50[B] lessens the total weight of a track. Insert 50[B] engages portion 51 of belt 47. A minimum size metal insert such as insert 50S lessens the total weight of a track. Insert 50S engages a minimum portion, portion 53 of belt 47. Minimum portion 53 is not expected to be less than 20% of the width of belt 47.

A metal insert such as metal inserts 40 and 50 of FIG. 12 may adopt any suitable length, such as length 40L and or length 50L of inserts 40 and 50 respectively, down to length 55 of minimum insert 50S.

Referring now to FIG. 15, track 54 includes the offset lug pattern discussed above and alternating metal inserts such as full size inserts 40 and mini-inserts 50. Track 54 is shown engaged to one or more drive sprockets such as drive sprocket 49 which has a plane of rotation 49R parallel to track centerline 24. In an alternate track configuration of FIG. 16, track 56 includes two different size metal inserts in a pattern composed of one full size metal insert such as insert 40 followed by two mini-inserts such as mini-insert 50. In another alternate configuration illustrated in FIG. 17, track 58 includes two different size metal inserts in a pattern composed of one full size metal insert such as insert 40 followed by four mini-inserts such as mini-insert 50.

A track may have three or more different size metal inserts to enable the weight of the track to be minimized while tailoring the flexibility of the track to the weight of the vehicle and the work environment expected. Referring now to FIG. 18 track 60 includes three different size metal inserts in a pattern composed of one full size metal insert such as insert 40 followed by one mini-insert such as mini-insert 50 followed by two minimum size inserts such as insert 50S which is followed by another mini-insert such as mini-insert 50. Any suitable combination and configuration of inserts may be used.

Figure 19A:
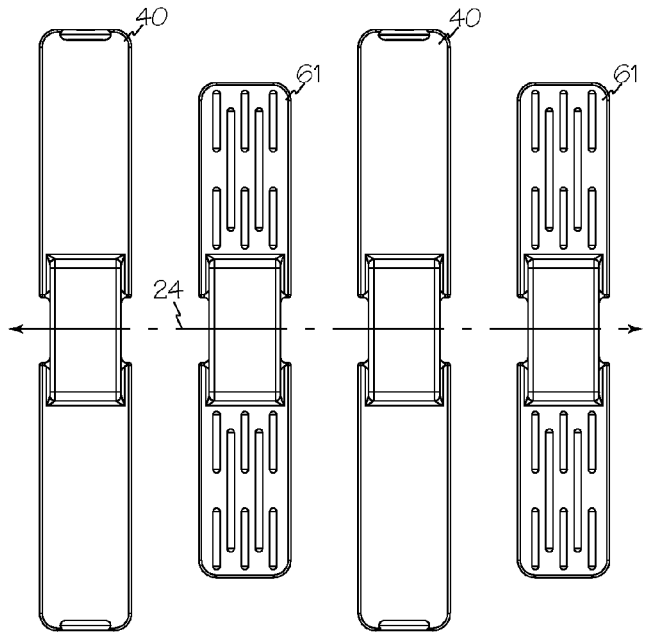
FIG. 19A is a top view of alternating full size and ribbed mini-inserts for an alternate track.
Figure 19B:
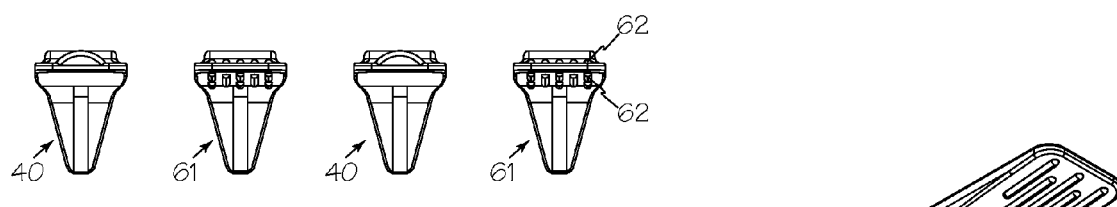
FIG. 19B is an end view of the alternating full size and ribbed mini-inserts of FIG. 19A.

Referring now to FIGS. 19A and 19B, full size metal inserts such as inserts may be combined with ribbed mini-inserts such as mini-inserts 61. One or more ribs such as rib 62 may be formed on the surface of a mini-insert to increase the surface area of the smaller metal inserts and thus improve the bonding of the metal insert to the rubber used to form the track.

Figure 20:
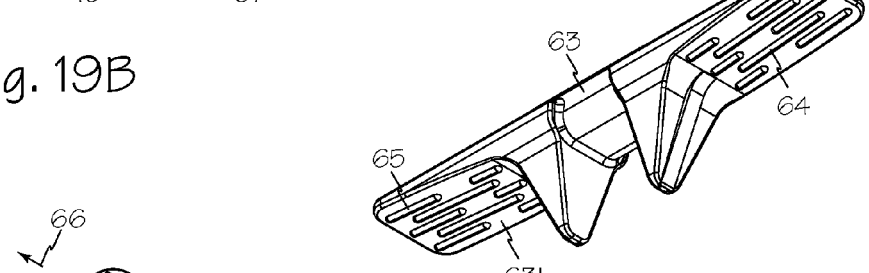
FIG. 20 is an lower perspective view of a ribbed mini-metal insert.
Figure 21:
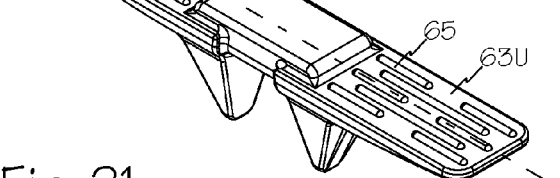
FIG. 21 is an upper perspective view of the ribbed mini-metal insert of FIG. 20.

Referring now to FIGS. 20 and 21, a mini-insert such as insert 63 may include one or more ribs, ridges, troughs and or holes to increase the surface area of the insert. One or more ribs such as ribs 64 and or rib 65 may be formed in or on upper surface 63U and or lower surface 63L of insert 63. In the illustrated configuration of FIGS. 20 and 21 ribs such as ribs 64 and 65 are oriented parallel to longitudinal or long axis 66 of mini-insert 63. Any other suitable orientation of ribs, ridges, troughs and or holes may be adopted.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. An offset track for engaging one or more drive sprockets of a tracked vehicle along a centerline of the track, the offset track comprising:

two continuous metal belts composed of a plurality of metal cables, each metal belt disposed on one side of the centerline;

a continuous rubber track body having an offset pattern of joint lugs and insert lugs relative to the centerline and enveloping the two continuous metal belts, the offset pattern of lugs having an alternating pattern of joint lugs and insert lugs; and a plurality of metal inserts for engaging the one or more drive sprockets of the tracked vehicle, the metal inserts oriented perpendicular the centerline of the track, the plurality of metal inserts composed of a group of full size metal inserts and a group of mini-inserts, the full size metal inserts engaging all the metal cables of each metal belt, the mini-inserts engaging a portion of the metal cables of each metal belt, the full size metal inserts and the mini-inserts arranged alternately along the centerline of the track.

* * * * *